(12) United States Patent
Ansari (10) Patent No.: US 11,263,991 B2
(45) Date of Patent: Mar. 1, 2022

(54) DELIVERY OF DISPLAY SYMBOLS TO A DISPLAY SOURCE

(71) Applicant: Intel Corporation, Santa Clara, CA (US)

(72) Inventor: Nausheen Ansari, Folsom, CA (US)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 16/231,295

(22) Filed: Dec. 21, 2018

(65) Prior Publication Data

US 2019/0147829 A1     May 16, 2019

(51) Int. Cl.
*G09G 5/00* (2006.01)
*G06T 1/20* (2006.01)
*H04L 1/00* (2006.01)

(52) U.S. Cl.
CPC .............. *G09G 5/006* (2013.01); *G06T 1/20* (2013.01); *H04L 1/0071* (2013.01); *G09G 2350/00* (2013.01); *G09G 2370/10* (2013.01); *G09G 2370/12* (2013.01)

(58) Field of Classification Search
CPC ......... G06T 1/20; H04L 1/0071; G09G 5/006; G09G 2350/00; G09G 2370/10; G09G 2370/12

USPC ........................................................ 345/520
See application file for complete search history.

(56) References Cited

U.S. PATENT DOCUMENTS

| | | | |
|---|---|---|---|
| 2012/0151537 A1* | 6/2012 | Singh ............... | H04N 21/43635 725/81 |
| 2017/0185555 A1* | 6/2017 | Chan ................... | G06F 13/4282 |
| 2017/0359513 A1* | 12/2017 | Anantharaman ..... | H04L 69/324 |
| 2019/0114282 A1* | 4/2019 | Kobayashi ............. | G06F 13/42 |

* cited by examiner

*Primary Examiner* — Jacinta M Crawford
(74) *Attorney, Agent, or Firm* — Hanley, Flight & Zimmerman, LLC (57) ABSTRACT

Technology for a display source controller is described. The display source controller can receive display pixel data from a display source. The display source controller can convert the display pixel data to display symbol data that includes a plurality of 32-bit double words (DWords). The display source controller can divide the display symbol data that includes the plurality of 32-bit DWords for a number of unidirectional serial data channels. The display source controller can process, for each unidirectional serial data channel, the display symbol data at a 32-bit DWord granularity level. The display source controller can send the display symbol data for each of the unidirectional serial data channels over a physical serial link to a display panel.

27 Claims, 8 Drawing Sheets

FIG. 1

| Lane3 | Byte0 | Byte1 | Byte2 | Byte3 |
|-------|-------|-------|-------|-------|
| Lane2 | Byte0 | Byte1 | Byte2 | Byte3 |
| Lane1 | Byte0 | Byte1 | Byte2 | Byte3 |
| Lane0 | Byte0 | Byte1 | Byte2 | Byte3 |
|       | TS[0] | TS[1] | TS[2] | TS[3] |

FIG. 2A

| Lane3 | DW0 | DW1 | DW2 | DW3 |
|-------|-----|-----|-----|-----|
| Lane2 | DW0 | DW1 | DW2 | DW3 |
| Lane1 | DW0 | DW1 | DW2 | DW3 |
| Lane0 | DW0 | DW1 | DW2 | DW3 |
|       | TS[0] | TS[1] | TS[2] | TS[3] |

DELIVERY OF DISPLAY SYMBOLS TO A DISPLAY SOURCE

BACKGROUND

Display interfaces can allow audio/video to be transmitted from a source device to a display device. Common types of display interfaces include, but are not limited to, High-Definition Multimedia Interface (HDMI), DisplayPort (DP), embedded DisplayPort (eDP), or Mobile Industry Processor Interface (MIPI) display serial interface (DSI). HDMI is a proprietary audio/video interface for transmitting uncompressed video data and compressed/uncompressed digital audio data from an HDMI-compliant source device, such as a display controller, to a compatible computer monitor, video projector, digital television or digital audio device. HDMI is a digital replacement for analog video standards. DisplayPort is a digital display interface that is standardized by the Video Electronics Standards Association (VESA). DisplayPort is an interface that is used to connect a video source to a display device, such as a computer monitor, and can carry audio and other forms of data. DisplayPort was designed to replace Video Graphics Array (VGA) and Digital Visual Interface (DVI). The DisplayPort interface is backward compatible with other interfaces, such as HDMI and DVI. eDP defines a standardized display panel interface for internal connections, e.g., graphics cards to notebook display panels. The MIPI DSI defines a high-speed serial interface between a host processor and a display module. The MIPI DSI enables manufacturers to integrate displays to achieve high performance and improved imagery and video scenes. The MIPI DSI is commonly used for displays in smartphones, tablets, laptops and vehicles.

BRIEF DESCRIPTION OF THE DRAWINGS

Features and advantages of technology embodiments will be apparent from the detailed description which follows, taken in conjunction with the accompanying drawings, which together illustrate, by way of example, various technology features; and, wherein.

Reference will now be made to the exemplary embodiments illustrated, and specific language will be used herein to describe the same. It will nevertheless be understood that no limitation on technology scope is thereby intended.

DESCRIPTION OF EMBODIMENTS

Before the disclosed technology embodiments are described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular examples or embodiments only and is not intended to be limiting. The same reference numerals in different drawings represent the same element. Numbers provided in flow charts and processes are provided for clarity in illustrating steps and operations and do not necessarily indicate a particular order or sequence.

Furthermore, the described features, structures, or characteristics can be combined in any suitable manner in one or more embodiments. In the following description, numerous specific details are provided, such as examples of layouts, distances, network examples, etc., to provide a thorough understanding of various technology embodiments. One skilled in the relevant art will recognize, however, that such detailed embodiments do not limit the overall technological concepts articulated herein, but are merely representative thereof.

As used in this written description, the singular forms "a," "an" and "the" include express support for plural referents unless the context clearly dictates otherwise. Thus, for example, reference to "a port" includes a plurality of such ports.

Reference throughout this specification to "an example" means that a particular feature, structure, or characteristic described in connection with the example is included in at least one embodiment of the present invention. Thus, appearances of the phrases "in an example" or "an embodiment" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations under the present disclosure.

Furthermore, the described features, structures, or characteristics can be combined in any suitable manner in one or more embodiments. In the following description, numerous specific details are provided, such as examples of layouts, distances, network examples, etc., to provide a thorough understanding of invention embodiments. One skilled in the relevant art will recognize, however, that the technology can be practiced without one or more of the specific details, or with other methods, components, layouts, etc. In other instances, well-known structures, materials, or operations may not be shown or described in detail to avoid obscuring aspects of the disclosure.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term in this written description, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

As used herein, comparative terms such as "increased," "decreased," "better," "worse," "higher," "lower," "enhanced," "maximized," "minimized," and the like refer to a property of a device, component, or activity that is measurably different from other devices, components, or activities in a surrounding or adjacent area, in a single device or in multiple comparable devices, in a group or class, in multiple groups or classes, or as compared to the known state of the art. For example, a data region that has an "increased" risk of corruption can refer to a region of a memory device which is more likely to have write errors to it than other regions in the same memory device. A number of factors can cause such increased risk, including location, fabrication process, number of program pulses applied to the region, etc.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

The term "coupled," as used herein, is defined as directly or indirectly connected in an electrical or nonelectrical manner. "Directly coupled" objects or elements are in physical contact with one another and are attached. Objects described herein as being "adjacent to" each other may be in physical contact with each other, in close proximity to each other, or in the same general region or area as each other, as appropriate for the context in which the phrase is used.

Numerical amounts and data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.3, 3, 3.8, 4, 4.6, 5, and 5.1 individually.

This same principle applies to ranges reciting only one numerical value as a minimum or a maximum. Furthermore, such an interpretation should apply regardless of the breadth of the range or the characteristics being described.

EXAMPLE EMBODIMENTS

An initial overview of technology embodiments is provided below and then specific technology embodiments are described in further detail later. This initial summary is intended to aid readers in understanding the technology more quickly, but is not intended to identify key or essential technological features nor is it intended to limit the scope of the claimed subject matter. Unless defined otherwise, all technical and scientific terms used herein have the same meaning as commonly understood by one of ordinary skill in the art to which this disclosure belongs.

DisplayPort (DP) is a digital display interface developed by a consortium of chip manufacturers and standardized by the Video Electronics Standards Association (VESA). DisplayPort can be used to connect a video source to a display device such as a computer monitor, and can carry audio data, video data, universal serial bus (USB) data, and other forms of data. DisplayPort can rely on packetized data transmission, and unlike legacy standards that transmit a clock signal with each output, the DisplayPort protocol is based on small data packets known as micro packets, which can embed the clock signal within the data stream, which allows for higher resolution using a reduced number of pins. DisplayPort can be used to transmit audio and video simultaneously, although each is optional and can be transmitted without the other.

A DisplayPort main link can be used for transmission of video and audio. The main link includes a number of unidirectional serial data channels that operate concurrently, which can be referred to as "lanes" herein. A standard DisplayPort connection can have 4 lanes, although some applications of DisplayPort can implement an increased number of lanes, such as 8 lanes. In a standard DisplayPort connection, each lane has a dedicated set of twisted-pair wires, and transmits data across the wires using differential signaling with American National Standards Institute (ANSI) 8b/10b encoding. In addition, a total bandwidth of the DisplayPort main link in a standard 4-lane connection can be an aggregate of all the lanes. In other words, the total bandwidth (or the number of binary digits transmitted per second) can be equal to the bandwidth per lane multiplied by the number of lanes.

DisplayPort offers a single-stream transport (SST) mode and a multi-stream transport (MST) mode. In SST mode, a standard single-display can be driven from one DP port on a source device. In MST mode, multiple independent displays can be driven from a single DP port on the source device. In the MST mode, the displays can be connected using a hub and/or by daisy-chaining.

In the previous DisplayPort specification (DP 1.4), packets known as "transfer units" (or TUs) can be formed as a set of data and control symbols. The symbols can be serialized onto a physical link, which can be a serial link. In DP 1.4, the number of lanes up to 4 and physical link frequencies up to 8.1 Gigahertz (GHz) can enable displays with 4K resolution and a 120 Hertz (Hz) refresh rate, as well as 5K resolution with a 60 Hz refresh rate.

The Next Generation DisplayPort 1.5 specification (DP 1.5 or DP Next) is targeting higher resolution and refresh rates as compared to DP 1.4. The Next Generation DP 1.5 specification is expected to have backward compatibility, e.g. the number of lanes is expected to be limited to 4, which is similar to DP 1.4. For the Next Generation DP 1.5 specification, the target link frequency is 20 GHz. Thus, the link frequency for DP 1.5 is expected to increase from 8.1 GHz (as defined in the DP 1.4 specification) to 20 GHz.

In one example, the terms "DP 1.4" and "DP 1.4 specification" and "DP 1.4 protocol" can be used interchangeably herein. In addition, the terms "DP 1.5" and "Next Generation DP 1.5 specification" and "Next Generation DP 1.5 protocol" can be used interchangeably herein.

In the Next Generation DP 1.5 specification, the link frequency is expected to increase from 8.1 GHz to 20 GHz (approximately three times), even though the number of lanes is expected to remain at 4. Reusing the DP 1.4 design of 4 lanes for a link frequency of 20 GHz would necessitate the logic to operate at nearly three times the current frequencies, which would be untenable. In other words, with the serial link frequency increasing by approximately three times with the number of lanes remaining the same, a symbol pipeline used to carry video and/or audio would also have to operate at corresponding higher frequencies, which would not be feasible using the DP 1.4 design.

Since the Next Generation DP 1.5 specification aims to reuse portions of the DP 1.4 protocol and implementation, an appropriate redefinition of the DP 1.4 specification is desired to minimize the impact to the previous implementations when operating at the new higher link frequencies (e.g., 20 GHz). Therefore, it is desirable to adapt the DP 1.4 implementations to target the higher link frequencies expected in the Next Generation DP 1.5 specification. More specifically, it is desirable to upgrade the symbol pipeline in the DP 1.4 implementations to generate data rates that match the higher link frequencies (i.e., higher link bandwidth) expected in the Next Generation DP 1.5 specification.

In the DP 1.4 specification, pixel data can be received from a video source, and the pixel data can be remapped to data symbols. In addition to the data symbols, control symbols can be used to indicate key events and attributes of a frame. In the DP 1.4 specification, each symbol (data symbol or control symbol) is a byte (8 bits), and data symbols and control symbols can be packaged together to form transfer units. The transfer units can be defined in terms of symbols (data symbols and control symbols). For example, one transfer unit may consist of anywhere from 32 to 64 symbols. The transfer units can be serialized over a physical serial link between a display source and a display panel. The symbol pipeline that carries the transfer units between the display source and the display panel can run at a defined frequency or bandwidth such that a throughput of the symbol pipeline matches a link frequency or bandwidth. However, with the link frequency increasing from 8.1 GHz to 20 GHz (approximately three times) and the removal of 8b/10b encoding overhead in the Next Generation DP 1.5 specification, the symbol pipeline would have to run at a link frequency or bandwidth that is approximately three times more than the previous DP 1.4 design, which would not be a viable option.

In the present technology, a symbol (data symbol or control symbol) can be redefined as a 32-bit double word (DWord). In other words, rather than a symbol consisting of a byte or 8 bits, as defined in the 1.4 specification, a symbol can be defined to consist of a 32-bit DWord in the Next Generation DP 1.5 specification. In the present technology, the transfer units can each comprise of 32-bit DWords, as the symbols (e.g., data symbols and control symbols) that are included in the transfer units can be DWords. By changing the definition of a symbol size from 8 bits to 32 bits (a multiple of 4), a width of the symbol pipeline can be quadrupled and an operational frequency of the symbol pipeline can be lowered. Thus, a throughput of the symbol pipeline can be adjusted to match the link frequency or bandwidth.

As described in further detail below, the processing of the transfer units in the symbol pipeline between the display source and the display panel can occur at a 32-bit DWord granularity level, as opposed to an 8-bit granularity level (or byte level), as in the DP 1.4 specification. For example, as described in further detail below, pixel-to-symbol conversion, encoding, scrambling, forward error correction (FEC), etc. for transfer units that contain symbols of audio/video data can be performed at the 32-bit DWord granularity level.

Figure 1:
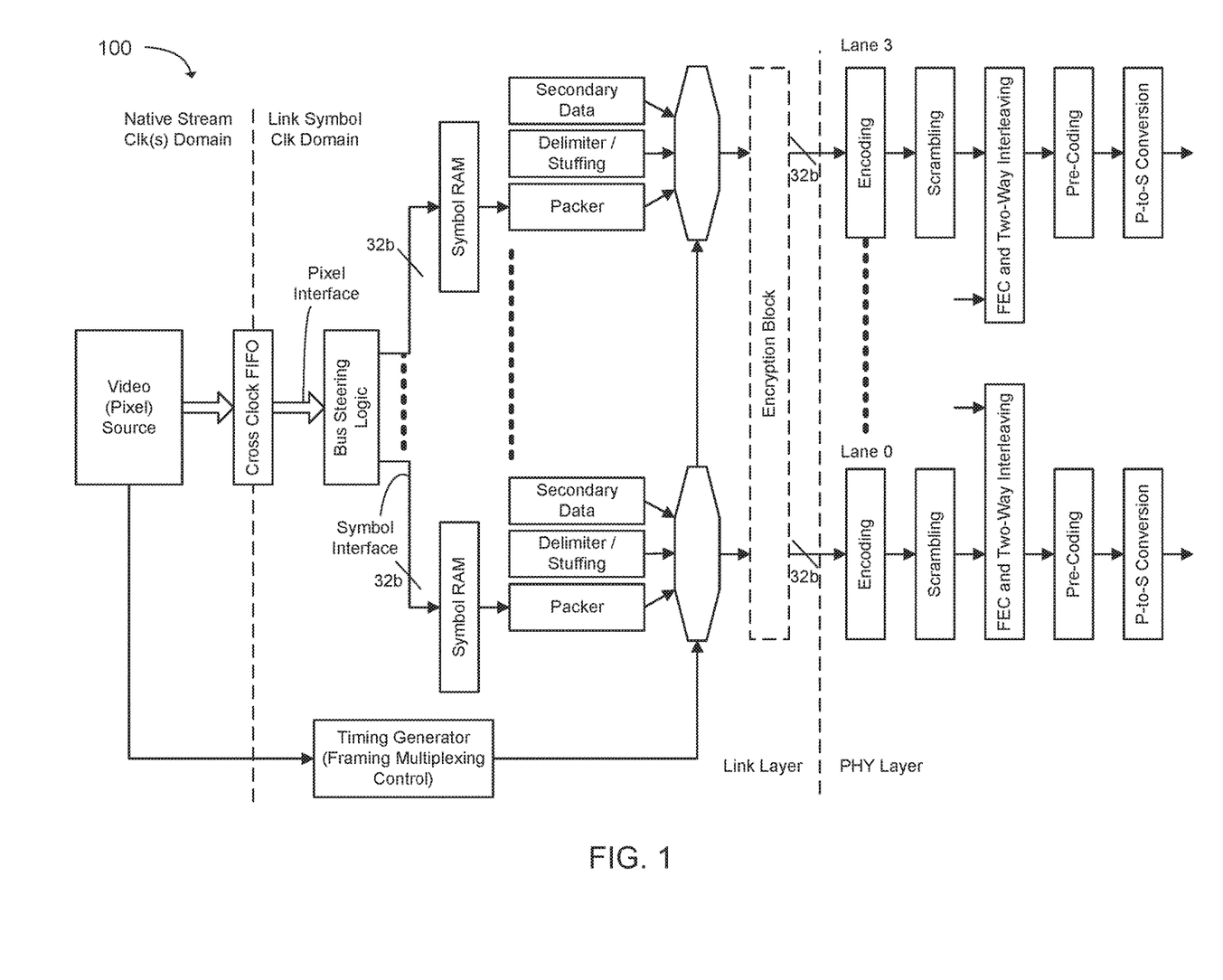
FIG. 1 illustrates a DisplayPort (DP) 1.4 specification compatible pipeline for providing display symbol data to a display panel that is adapted for a Next Generation DP 1.5 specification in accordance with an example embodiment.

FIG. 1 illustrates an example of a novel DP symbol pipeline 100 in which symbol data is processed at a 32-bit DWord granularity level. The DP symbol pipeline 100 can be a DP 1.4 specification pipeline that provides display symbol data to a display panel that is adapted for a Next Generation DP 1.5 specification. In other words, the DP symbol pipeline 100 shown in FIG. 1 can be a DP 1.4 specification pipeline that is modified to comply with the Next Generation DP 1.5 specification. The DP symbol pipeline 100 can be backwards compatible, such that the DP symbol pipeline 100 can support the Next Generation DP 1.5 specification as well as the DP 1.4 specification and earlier specification versions. The DP symbol pipeline 100 can be used to provide the display symbol data as well as display symbol control data from a display source to the display panel. In addition, the DP symbol pipeline 100 can support sending a single stream of display symbol data, as in the SST mode, as well as multiple streams of display symbol data, as in the MST mode.

In one example, the DP symbol pipeline 100 can include a display source (or video pixel source) in a native stream clock (clk) domain. The display source can be connected to a timing generator (for framing multiplexing control). Display pixel data from the display source can be provided to a cross clock first-in first-out (FIFO) circuit, which can be connected to bus steering logic in a link symbol clk domain. The cross clock FIFO circuit can have a pixel interface with the bus steering logic. In one example, the bus steering logic in the DP symbol pipeline 100 can receive the display pixel data from the display source via the cross clock FIFO circuit, and the bus steering logic can perform a pixel-to-symbol conversion with the display pixel data. The bus steering logic can convert the display pixel data to the display symbol data, where the display symbol data comprises a plurality of 32-bit DWords (as opposed to 8-bit symbols as in the previous DP 1.4 protocol). In this example, the display symbol data can also include display symbol control data. The bus steering logic can obtain the display symbol data consisting of 32-bit DWords from the display pixel data, and the bus steering logic can split or divide the display symbol data for each of a plurality of lanes (or unidirectional serial data channels). In this example, the bus steering logic can split or divide the display symbol data for four separate lanes. More specifically, the bus steering logic can send display symbol data to a symbol random access memory (RAM) for each of the four lanes, where a 32-bit symbol interface exists between the bus steering logic and each of the lanes.

In one example, the pixel-to-symbol conversion can be specific to the DP protocol. Other standards, such as HDMI and MIPI, can send a whole pixel. For example, in HDMI, red (R), green (G) and blue (B) components of a pixel can be sent on different lanes of a pipeline.

In one example, display symbol data that has been received at a given lane can be processed in a similar manner as the other three lanes in the DP symbol pipeline 100. For example, for each of the four lanes, the symbol RAM can receive the display symbol data via a 32-bit symbol interface between the symbol RAM and the steering logic. The symbol RAM can perform various types of processing on the display symbol data, such as secondary data, delimiter/stuffing, packer, etc. functionalities, and an output can be combined with an output of the timing generator (for framing multiplexing control), and then provided to an encryption block in a link layer. For each of the four lanes, the encryption block can provide the display symbol data (having a 32-bit DWord granularity level) for encoding, scrambling, FEC and two-way interleaving, pre-coding and parallel to serial (P-S) conversion. For each of the four lanes, the encoding, scrambling, FEC and two-way interleaving, pre-coding and P-S conversion can occur at a physical layer, and each can be performed at a 32-bit DWord granularity level.

In one example, after the DP symbol pipeline 100 is used to perform the encoding, scrambling, FEC and two-way interleaving, pre-coding and P-S conversion, etc. occurs at the physical layer at the 32-bit DWord granularity level, the display symbol data can be sent to the display panel over a physical serial link. The display panel can perform appropriate functions, such as decoding, unscrambling, etc. and display the display symbol data on the display panel.

In one example, the display symbol data can be sent as a burst to the four lanes in the DP symbol pipeline 100, and certain symbols in the display symbol data can be subject to a fill. For example, a given fill can be associated with a fill start and a fill end, and the fill can also be at a 32-bit DWord granularity level. Typically, DP panels do not have frame buffers, so even in a burst mode, a complete frame cannot be sent as a burst to the display panel. The display panel can have a certain amount of storage based on the DP specification. The display source can burst an amount of data that the display panel can store. While the display source waits for the data to be consumed by the display panel, the display source can send the fill (or dummy data).

In one example, the DP symbol pipeline 100 that converts the display pixel data to the display symbol data at the 32-bit DWord granularity level and subsequently processing the display symbol data at the 32-bit DWord granularity level accordingly can be implemented using a display source controller that is associated with the display source. The display symbol data that is outputted from the DP symbol pipeline 100 can be provided to the display panel. Therefore, both the display source controller and the display panel (or panel sink) can support this capability, i.e., pixel-to-symbol conversion and symbol processing at the 32-bit DWord granularity level.

In the configuration shown in FIG. 1, the DP symbol pipeline 100 can support an increased link frequency of 20 GHz for both the SST mode and the MST mode, and the DP symbol pipeline 100 can be used to convert the display pixel data to display symbol data consisting of a plurality of 32-bit DWords, as opposed to 8-bit symbols as in the previous DP 1.4 protocol. As a result, a width of the DP symbol pipeline 100 can be quadrupled and an operational frequency of the DP symbol pipeline 100 can be lowered, and without additional overhead resulting from changing the granularity level from 8-bit symbols to 32-bit DWords at the link layer. Thus, a throughput of the DP symbol pipeline 100 can be adjusted to match the link frequency or bandwidth, thereby allowing the DP symbol pipeline 100 to support an increase in link frequency from 8.1 GHz to 20 GHz even though the DP symbol pipeline 100 continues to have only four lanes. In other words, by changing the granularity level from 8-bit symbols to 32-bit DWords at the link layer, the increased link frequency of 20 GHz can be supported by the DP symbol pipeline 100, without actually increasing a frequency of the DP symbol pipeline 100 by three times (e.g., from 8.1 GHz to 20 GHz).

In one example, in SST, display symbol control data (e.g., control symbols inserted for blank-start, blank-end, fill-start, dummy and fill-end) can be defined to be four identical bytes. With the novel DP symbol pipeline 100, the inserted display symbol control data would not cause additional overhead since the display symbol control data are used to fill empty slots on a link, which is independent of a width of the DP symbol pipeline 100. In another example, in MST, payload bandwidth management and virtual channel allocation in each multi-stream transport packet (MTP) can be in terms of 32-bit DWords, and there is no additional overhead for control character insertion.

Figure 2A:
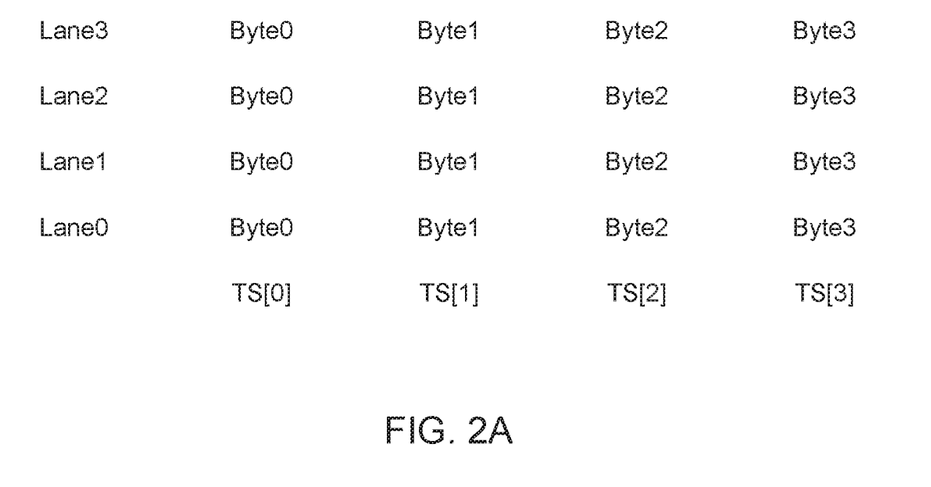
FIG. 2A illustrates a data stream that includes display symbol data in accordance with a DisplayPort (DP) 1.4 specification in accordance with an example embodiment.

FIG. 2A illustrates an example of a data stream that includes display symbol data that is sent in a traditional DP pipeline in accordance with a DP 1.4 specification. As shown in FIG. 2A, the traditional DP pipeline can use a first lane (Lane0) to send a byte at a corresponding time slot (e.g., Byte0 at TS[0], Byte1 at TS[1], Byte2 at TS[2] and Byte3 at TS[3]). Similarly, as shown in FIG. 2A, the traditional DP pipeline can use a second lane (Lane1), a third lane (Lane2) and a fourth lane (Lane3) to send four bytes at four corresponding time slots, respectively.

Figure 2B:
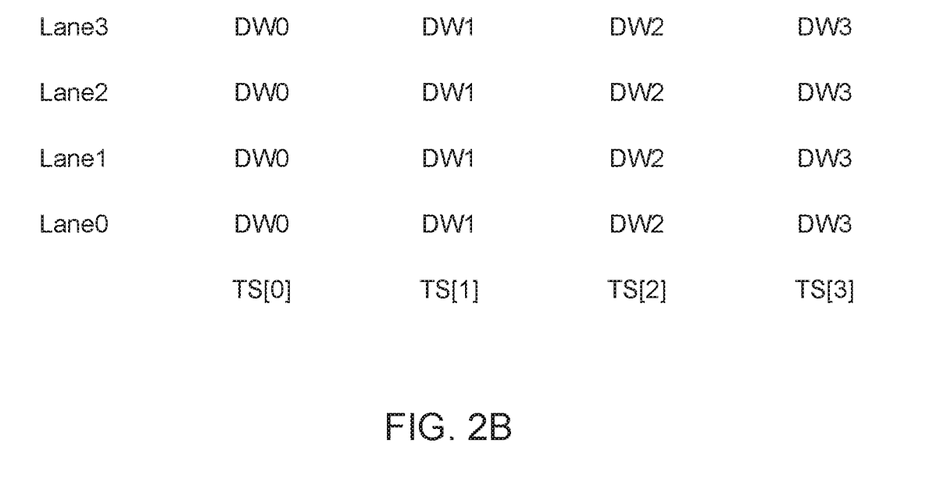
FIG. 2B illustrates a data stream that includes display symbol data in accordance with a DisplayPort (DP) 1.4 specification compatible pipeline adapted for a Next Generation DP 1.5 specification in accordance with an example embodiment.

FIG. 2B illustrates an example of a data stream that includes display symbol data that is sent in a novel DP pipeline. The novel DP pipeline (as shown in FIG. 1) can be in accordance with a DP 1.4 specification compatible pipeline adapted for a Next Generation DP 1.5 specification. As shown in FIG. 2B, the novel DP pipeline can use a first lane (Lane0) to send a DWord at a corresponding time slot (e.g., DW0 at TS[0], DW1 at TS[1], DW2 at TS[2] and DW3 at TS[3]). Similarly, as shown in FIG. 2B, the novel DP pipeline can use a second lane (Lane1), a third lane (Lane2) and a fourth lane (Lane3) to send four DWords at four corresponding time slots, respectively.

In an alternative configuration, an entire DP pipeline can be widened from 4 lanes to 16 lanes. In the previous DP 1.4 protocol, four identical pipelines were used to each generate an 8-bit symbol catering to a lane on a DP connector. In the alternative configuration, to service the desired throughput specified in the Next Generation 1.5 specification, four sets of four identical pipelines can be instantiated, with each set of four DP 1.4 lanes feeding a single Next Generation DP 1.5 lane running at 20 GHz. The mapping of DP 1.4 byte symbols and lanes to Next Generation DP 1.5 DWord symbols and lanes is shown in detail below.

Figure 3:
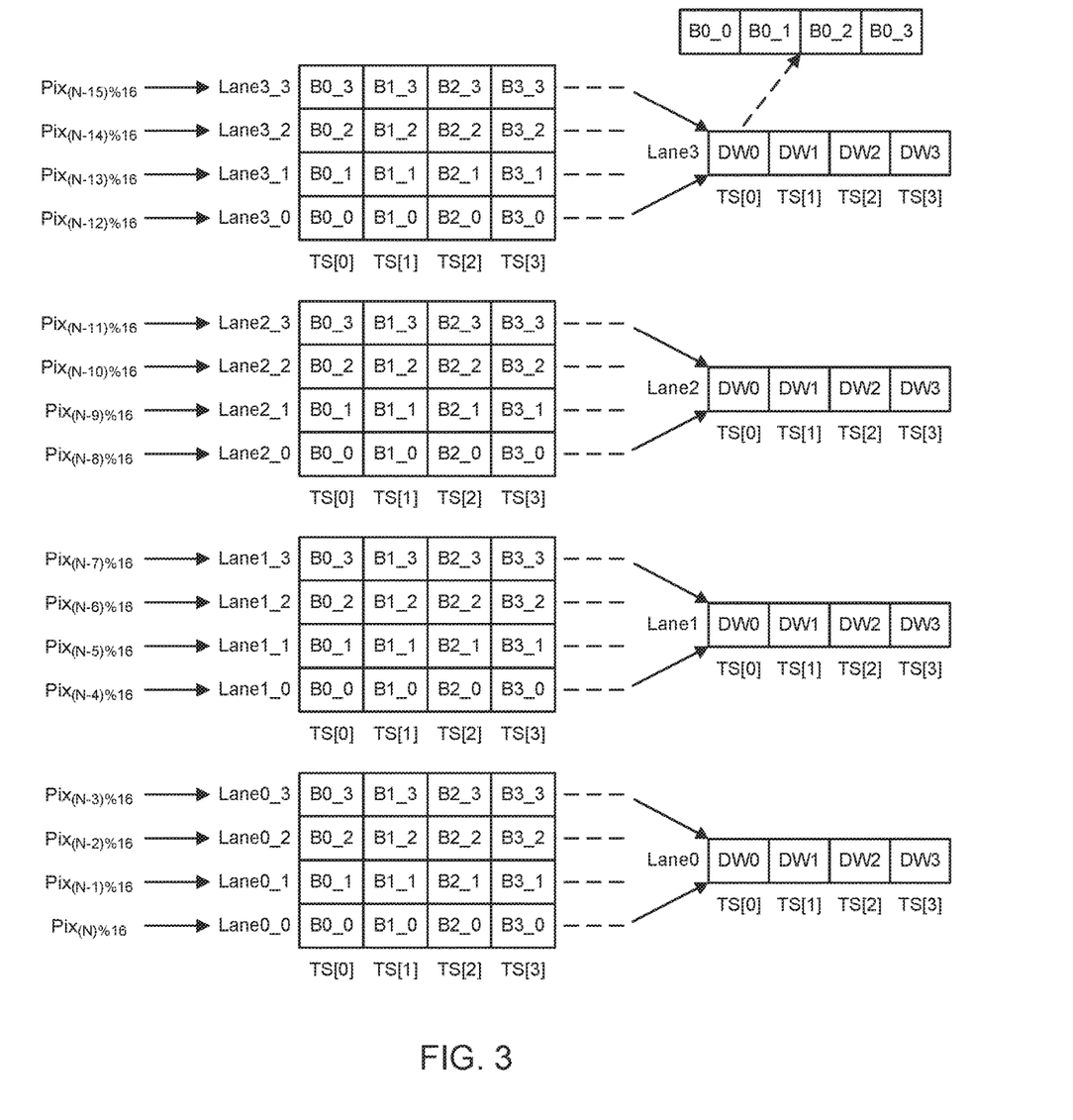
FIG. 3 illustrates a DisplayPort (DP) 1.4 specification to Next Generation DP 1.5 specification symbol and lane mapping technique in accordance with an example embodiment.

FIG. 3 illustrates an example of a DP 1.4 specification to Next Generation DP 1.5 specification symbol and lane mapping technique. As shown in FIG. 3, a first DP 1.4 pipeline can be used to receive pixel data for four separate DP 1.4 lanes (e.g., Lane0_3, Lane0_2, Lane0_1 and Lane0_0). Each of these four lanes can include four bytes at four corresponding time slots, respectively. The four lanes of the first DP 1.4 pipeline can be mapped to a first Next Generation DP 1.5 lane (e.g., Lane0), which can be used to send a fourth of each of four 32-bit DWords at four corresponding time slots, respectively. Similarly, a second DP 1.4 pipeline, a third DP 1.4 pipeline and a fourth DP 1.4 pipeline can be used to each receive pixel data for four separate DP 1.4 lanes, respectively. The four lanes of each of the second DP 1.4 pipeline, a third DP 1.4 pipeline and a fourth DP 1.4 pipeline can be mapped to a second, third and fourth Next Generation DP 1.5 lane (e.g., Lane1, Lane2 and Lane3), which can each be used to send a fourth of each of four 32-bit DWords at four corresponding time slots, respectively. The four DP 1.4 pipelines that each have four separate lanes can work in parallel to create the four Next Generation DP 1.5 lanes. As a result, DP 1.4 byte symbols and lanes can be mapped to Next Generation DP 1.5 DWord symbols and lanes accordingly.

In one example, the mapping of DP 1.4 byte symbols and lanes to Next Generation DP 1.5 DWord symbols and lanes shown in FIG. 3 can be applicable to both the SST mode and the MST mode.

Figure 4:
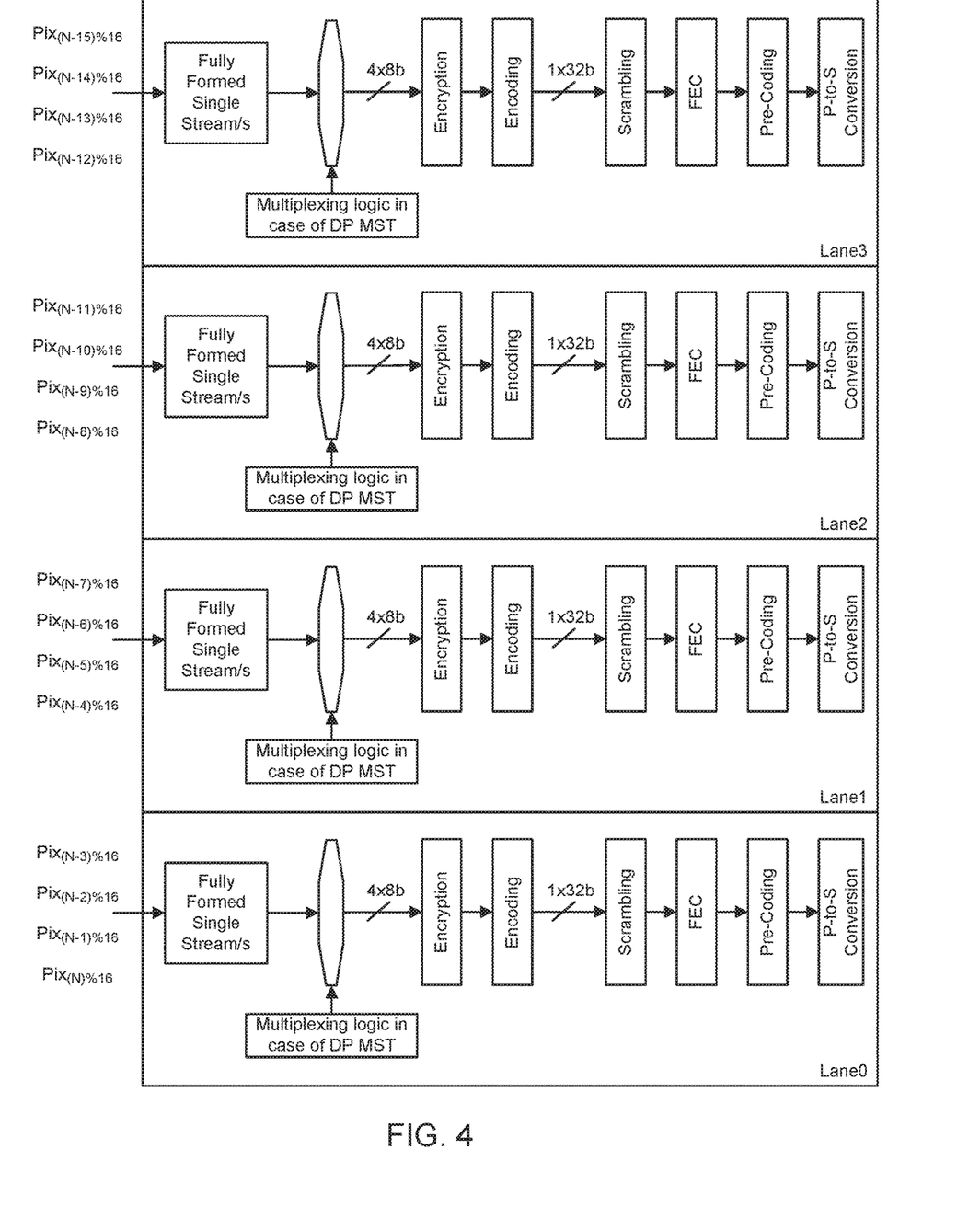
FIG. 4 illustrates a Next Generation DisplayPort (DP) 1.5 specification pipeline for providing display symbol data to a display panel in accordance with an example embodiment.

FIG. 4 illustrates an example of a Next Generation DP 1.5 specification pipeline for providing display symbol data to a display panel. In this configuration, to service a desired throughput specified in the Next Generation 1.5 specification, four sets of four identical pipelines can be instantiated, with each set of four DP 1.4 lanes feeding a single Next Generation DP 1.5 lane running at 20 GHz. There can be four separate Next Generation DP 1.5 lanes, with each lane applying multiplexing, encryption, encoding, scrambling, FEC, pre-coding and P-to-S conversion accordingly.

As shown in FIG. 4, for a given Next Generation DP 1.5 lane (e.g., Lane0), pixel data received for four separate DP 1.4 lanes can be mapped to a single Next Generation DP 1.5 lane, as shown in FIG. 3. The single Next Generation DP 1.5 lane can be used to carry four 32-bit DWords at four corresponding time slots (or a fully formed single stream). The single stream can be provided to multiplexing logic (in the case of MST). Then, the single stream can be provided to an encryption block, an encoding block, a scrambling block, an FEC block, a pre-coding block, and a P-to-S conversion block, respectively, that each function at a 32-bit DWord granularity level.

Figure 5:
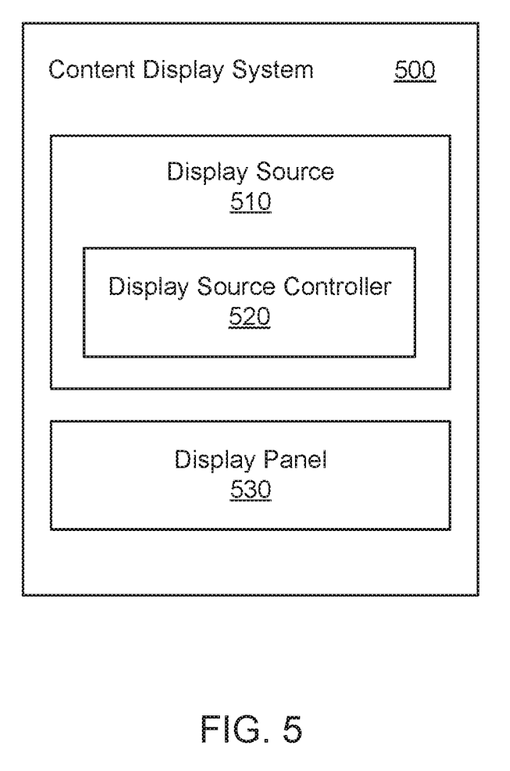
FIG. 5 illustrates a content display system in accordance with an example embodiment.

FIG. 5 illustrates a content display system 500. The content display system 500 can include a display source 510, a display source controller 520 and a display panel 530. The display source controller 520 can include logic to receive display pixel data from the display source 510. The display source controller 520 can include logic to convert the display pixel data to display symbol data that includes a plurality of 32-bit double words (DWords). The display source controller 520 can include logic to divide the display symbol data that includes the plurality of 32-bit DWords for a number of unidirectional serial data channels. The display source controller 520 can include logic to process, for each unidirectional serial data channel, the display symbol data at a 32-bit DWord granularity level. The display source controller 520 can include logic to send the display symbol data for each of the unidirectional serial data channels over a physical serial link to the display panel 530.

In one example, the display source controller 520 and the display panel 530 can be in accordance with a Next Generation DisplayPort (DP) 1.5 specification. In addition, the display source controller 520 and the display panel 530 can support a single stream (SST) transport mode or a multi-stream (MST) transport mode.

In one example, the display source controller 520 can redefine a granularity level of the display symbol data from a byte-level consisting of 8 bits to a DWord-level consisting of 32 bits to handle an increase in physical serial link frequency from 8.1 Gigahertz (GHz) to 20 GHz. The granularity level of the display symbol data can be redefined from the byte-level to the DWord-level to quadruple a symbol pipeline width and reduce an operational frequency of the symbol pipeline width, and adjust the operational frequency to match a physical serial link bandwidth.

In one example, the display source controller 520 can process the display symbol data for each unidirectional serial data channel by encrypting the display symbol data at the DWord granularity level. The display source controller 520 can process the display symbol data for each unidirectional serial data channel by encoding, for each unidirectional serial data channel, the display symbol data at the DWord granularity level. The display source controller 520 can process the display symbol data for each unidirectional serial data channel by scrambling, for each unidirectional serial data channel, the display symbol data at the DWord granularity level. The display source controller 520 can process the display symbol data for each unidirectional serial data channel by performing forward error correction (FEC) and two-way interleaving, for each unidirectional serial data channel, the display symbol data at the DWord granularity level. The display source controller 520 can process the display symbol data for each unidirectional serial data channel by pre-coding, for each unidirectional serial data channel, the display symbol data at the DWord granularity level. The display source controller 520 can process the display symbol data for each unidirectional serial data channel by performing a parallel to serial (P-S) conversion, for each unidirectional serial data channel, the display symbol data at the DWord granularity level. In addition, the conversion and division of the display symbol data at the display source controller 520 can occur at a link layer, and the processing of the display symbol data for each unidirectional serial data channel at the display source controller 520 can occur at a physical layer.

In one example, the display source controller 520 can send a transfer unit (TU) that includes the display symbol data for each of the unidirectional serial data channels to the display panel 530 over the physical serial link, and the TU can include 32 to 64 32-bit DWords. The TU can include display symbol control data that comprises a plurality of DWords to indicate events and attributes of a frame. In addition, the unidirectional serial data channels can operate concurrently, and the number of unidirectional serial data channels can be equal to four in accordance with the Next Generation DisplayPort (DP) 1.5 specification.

Figure 6:
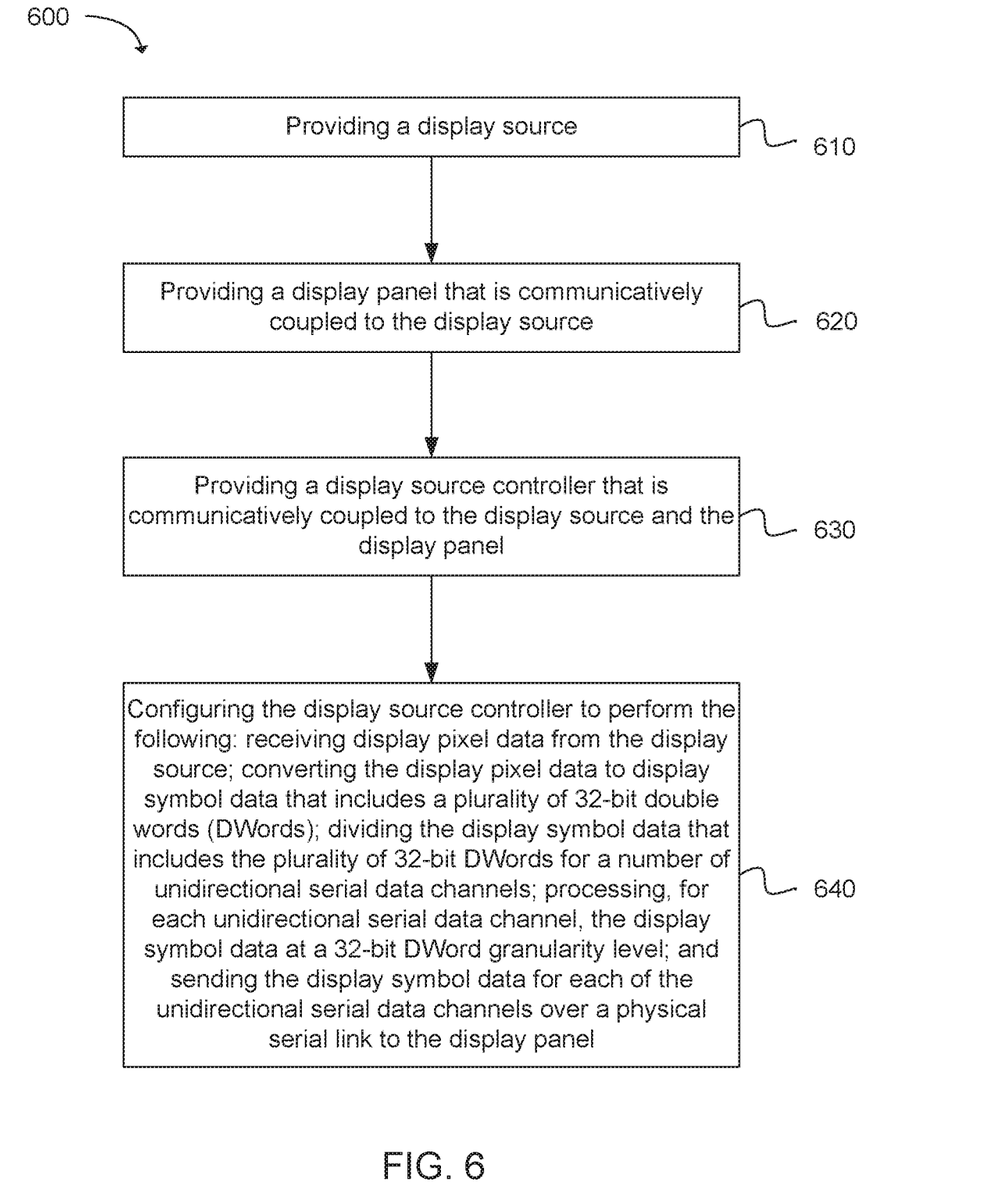
FIG. 6 is a flowchart illustrating operations for sending display symbol data from a display source controller to a display panel in accordance with an example embodiment.

Another example provides a method 600 for making a content display system, as shown in the flow chart in FIG. 6. The method can be executed as instructions on a machine, where the instructions are included on at least one computer readable medium or one non-transitory machine readable storage medium. The method can include the operation of providing a display source, as in block 610. The method can include the operation of providing a display panel that is communicatively coupled to the display source, as in block 620. The method can include the operation of providing a display source controller that is communicatively coupled to the display source and the display panel, as in block 630. The method can include the operation of configuring the display source controller to perform the following: receiving display pixel data from the display source; converting the display pixel data to display symbol data that includes a plurality of 32-bit double words (DWords); dividing the display symbol data that includes the plurality of 32-bit DWords for a number of unidirectional serial data channels; processing, for each unidirectional serial data channel, the display symbol data at a 32-bit DWord granularity level; and sending the display symbol data for each of the unidirectional serial data channels over a physical serial link to the display panel, as in block 640.

Figure 7:
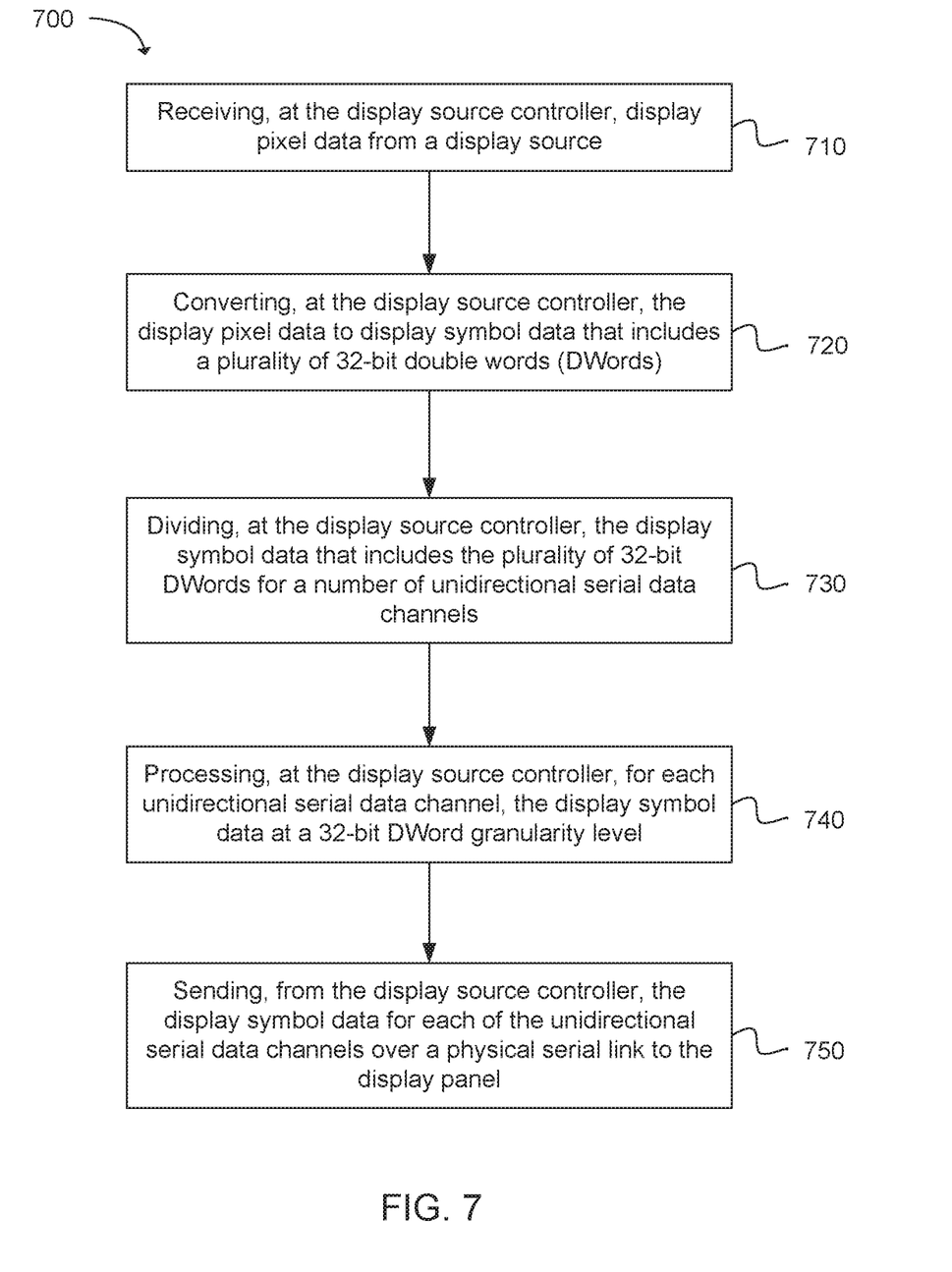
FIG. 7 is a flowchart illustrating operations for making a content display system in accordance with an example embodiment.

Another example provides a method 700 for sending display symbol data from a display source controller to a display panel, as shown in the flow chart in FIG. 7. The method can be executed as instructions on a machine, where the instructions are included on at least one computer readable medium or one non-transitory machine readable storage medium. The method can include the operation of receiving, at the display source controller, display pixel data from a display source, as in block 710. The method can include the operation of converting, at the display source controller, the display pixel data to display symbol data that includes a plurality of 32-bit double words (DWords), as in block 720. The method can include the operation of dividing, at the display source controller, the display symbol data that includes the plurality of 32-bit DWords for a number of unidirectional serial data channels, as in block 730. The method can include the operation of processing, at the display source controller, for each unidirectional serial data channel, the display symbol data at a 32-bit DWord granularity level, as in block 740. The method can include the operation of sending, from the display source controller, the display symbol data for each of the unidirectional serial data channels over a physical serial link to the display panel, as in block 750.

Figure 8:
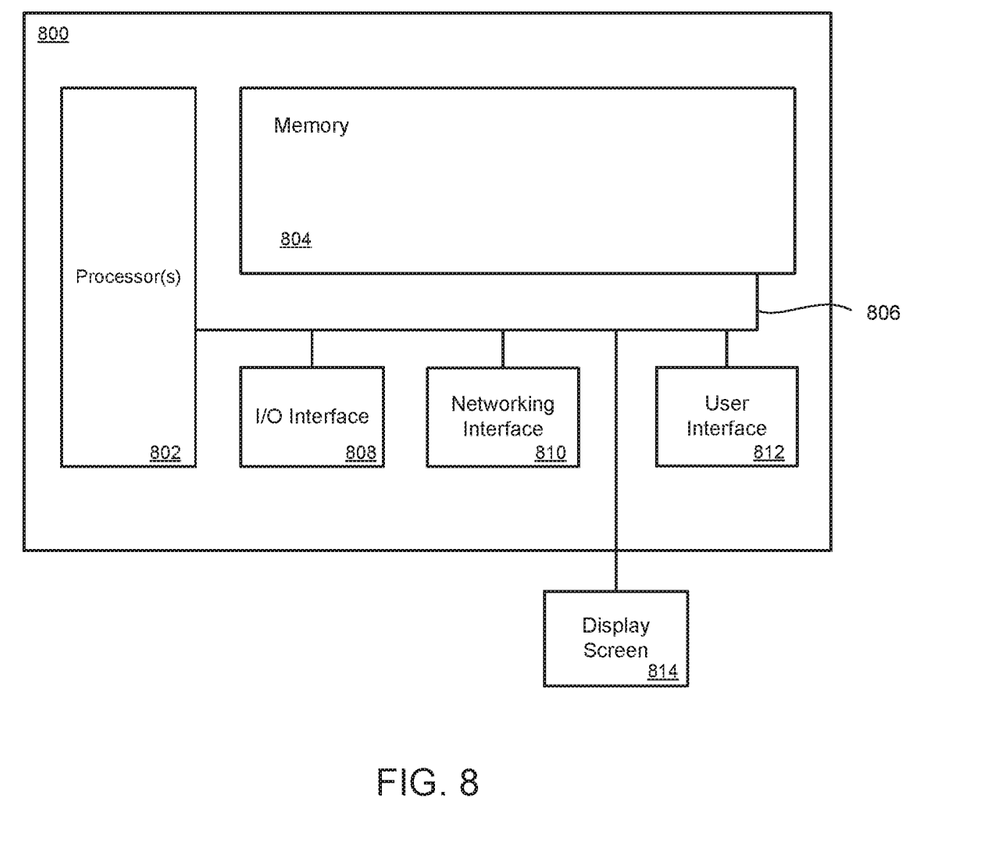
FIG. 8 illustrates a computing system that includes a data storage device in accordance with an example embodiment.

FIG. 8 illustrates a general computing system or device 800 that can be employed in the present technology. The computing system 800 can include a processor 802 in communication with a memory 804. The memory 804 can include any device, combination of devices, circuitry, and the like that is capable of storing, accessing, organizing, and/or retrieving data. Non-limiting examples include SANs (Storage Area Network), cloud storage networks, volatile or non-volatile RAM, phase change memory, optical media, hard-drive type media, and the like, including combinations thereof.

The computing system or device 800 additionally includes a local communication interface 806 for connectivity between the various components of the system. For example, the local communication interface 806 can be a local data bus and/or any related address or control busses as may be desired.

The computing system or device 800 can also include an I/O (input/output) interface 808 for controlling the I/O functions of the system, as well as for I/O connectivity to devices outside of the computing system 800. A network interface 810 can also be included for network connectivity. The network interface 810 can control network communications both within the system and outside of the system. The network interface can include a wired interface, a wireless interface, a Bluetooth interface, optical interface, and the like, including appropriate combinations thereof. Furthermore, the computing system 800 can additionally include a user interface 812, a display device 814, as well as various other components that would be beneficial for such a system.

The processor 802 can be a single or multiple processors, and the memory 804 can be a single or multiple memories. The local communication interface 806 can be used as a pathway to facilitate communication between any of a single processor, multiple processors, a single memory, multiple memories, the various interfaces, and the like, in any useful combination.

Various techniques, or certain aspects or portions thereof, can take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a RAM, EPROM, flash drive, optical drive, magnetic hard drive, solid state drive, or other medium for storing electronic data. The node and wireless device can also include a transceiver module, a counter module, a processing module, and/or a clock module or timer module. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations. Exemplary systems or devices can include without limitation, laptop computers, tablet computers, desktop computers, smart phones, computer terminals and servers, storage databases, and other electronics which utilize circuitry and programmable memory, such as household appliances, smart televisions, digital video disc (DVD) players, heating, ventilating, and air conditioning (HVAC) controllers, light switches, and the like.

EXAMPLES

The following examples pertain to specific technology embodiments and point out specific features, elements, or steps that can be used or otherwise combined in achieving such embodiments.

In one example, there is provided a display source controller. The display source controller can comprise logic to receive display pixel data from a display source. The display source controller can comprise logic to convert the display pixel data to display symbol data that includes a plurality of 32-bit double words (DWords). The display source controller can comprise logic to divide the display symbol data that includes the plurality of 32-bit DWords for a number of unidirectional serial data channels. The display source controller can comprise logic to process, for each unidirectional serial data channel, the display symbol data at a 32-bit DWord granularity level. The display source controller can comprise logic to send the display symbol data for each of the unidirectional serial data channels over a physical serial link to a display panel.

In one example of the display source controller, the display source controller can further comprise logic to: redefine a granularity level of the display symbol data from a byte-level consisting of 8 bits to a DWord-level consisting of 32 bits to handle an increase in physical serial link frequency from 8.1 Gigahertz (GHz) to 20 GHz.

In one example of the display source controller, the granularity level of the display symbol data is redefined from the byte-level to the DWord-level to quadruple a symbol pipeline width and reduce an operational frequency of the symbol pipeline width, and adjust the operational frequency to match a physical serial link bandwidth.

In one example of the display source controller, the logic to process the display symbol data for each unidirectional serial data channel can further comprise logic to: encrypt the display symbol data at the DWord granularity level; encode, for each unidirectional serial data channel, the display symbol data at the DWord granularity level; scramble, for each unidirectional serial data channel, the display symbol data at the DWord granularity level; perform forward error correction (FEC) and two-way interleaving, for each unidirectional serial data channel, the display symbol data at the DWord granularity level; pre-code, for each unidirectional serial data channel, the display symbol data at the DWord granularity level; and perform a parallel to serial (P-S) conversion, for each unidirectional serial data channel, the display symbol data at the DWord granularity level.

In one example of the display source controller, the display source controller can further comprise logic to: send a transfer unit (TU) that includes the display symbol data for each of the unidirectional serial data channels to the display panel over the physical serial link, wherein the TU includes 32 to 64 32-bit DWords.

In one example of the display source controller, the TU includes display symbol control data comprising of a plurality of DWords to indicate events and attributes of a frame.

In one example of the display source controller, the unidirectional serial data channels operate concurrently, and the number of unidirectional serial data channels is equal to four in accordance with a Next Generation DisplayPort (DP) 1.5 specification.

In one example of the display source controller, conversion and division of the display symbol data occurs at a link layer, and processing of the display symbol data for each unidirectional serial data channel occurs at a physical layer.

In one example of the display source controller, the display source controller and the display panel support a single stream (SST) transport mode or a multi-stream (MST) transport mode.

In one example of the display source controller, the display source controller and the display panel are in accordance with a Next Generation DisplayPort (DP) 1.5 specification.

In one example, there is provided a content display system. The content display system can include a display source, a display panel and a display source controller. The display source controller can comprise logic to: receive display pixel data from the display source; convert the display pixel data to display symbol data that includes a plurality of 32-bit double words (DWords); divide the display symbol data that includes the plurality of 32-bit DWords for a number of unidirectional serial data channels; process, for each unidirectional serial data channel, the display symbol data at a 32-bit DWord granularity level; and send the display symbol data for each of the unidirectional serial data channels over a physical serial link to the display panel.

In one example of the content display system, the display source controller further comprises logic to: redefine a granularity level of the display symbol data from a byte-level consisting of 8 bits to a DWord-level consisting of 32 bits to handle an increase in physical serial link frequency from 8.1 Gigahertz (GHz) to 20 GHz.

In one example of the content display system, the granularity level of the display symbol data is redefined from the byte-level to the DWord-level to quadruple a symbol pipeline width and reduce an operational frequency of the symbol pipeline width, and adjust the operational frequency to match a physical serial link bandwidth.

In one example of the content display system, the logic in the display source controller to process the display symbol data for each unidirectional serial data channel further comprises logic to: encrypt the display symbol data at the DWord granularity level; encode, for each unidirectional serial data channel, the display symbol data at the DWord granularity level; scramble, for each unidirectional serial data channel, the display symbol data at the DWord granularity level; perform forward error correction (FEC) and two-way interleaving, for each unidirectional serial data channel, the display symbol data at the DWord granularity level; pre-code, for each unidirectional serial data channel, the display symbol data at the DWord granularity level; and perform a parallel to serial (P-S) conversion, for each unidirectional serial data channel, the display symbol data at the DWord granularity level.

In one example of the content display system, the display source controller further comprises logic to: send a transfer unit (TU) that includes the display symbol data for each of the unidirectional serial data channels to the display panel over the physical serial link, wherein the TU includes 32 to 64 32-bit DWords.

In one example of the content display system, the TU includes display symbol control data comprising of a plurality of DWords to indicate events and attributes of a frame.

In one example of the content display system, the unidirectional serial data channels operate concurrently, and the number of unidirectional serial data channels is equal to four in accordance with a Next Generation DisplayPort (DP) 1.5 specification.

In one example of the content display system, conversion and division of the display symbol data at the display source controller occurs at a link layer, and processing of the display symbol data for each unidirectional serial data channel at the display source controller occurs at a physical layer.

In one example of the content display system, the display source controller and the display panel support a single stream (SST) transport mode or a multi-stream (MST) transport mode.

In one example of the content display system, the display source controller and the display panel are in accordance with a Next Generation DisplayPort (DP) 1.5 specification.

In one example, there is provided a method of making a content display system. The method can include providing a display source. The method can include providing a display panel that is communicatively coupled to the display source. The method can include providing a display source controller that is communicatively coupled to the display source and the display panel. The method can include configuring the display source controller to perform the following: receiving display pixel data from the display source; converting the display pixel data to display symbol data that includes a plurality of 32-bit double words (DWords); dividing the display symbol data that includes the plurality of 32-bit DWords for a number of unidirectional serial data channels; processing, for each unidirectional serial data channel, the display symbol data at a 32-bit DWord granularity level; and sending the display symbol data for each of the unidirectional serial data channels over a physical serial link to the display panel.

In one example of the method of making the content display system, the method can further include configuring the display source controller logic to perform the following: redefining a granularity level of the display symbol data from a byte-level consisting of 8 bits to a DWord-level consisting of 32 bits to handle an increase in physical serial link frequency from 8.1 Gigahertz (GHz) to 20 GHz.

In one example of the method of making the content display system, the granularity level of the display symbol data is redefined from the byte-level to the DWord-level to quadruple a symbol pipeline width and reduce an operational frequency of the symbol pipeline width, and adjust the operational frequency to match a physical serial link bandwidth.

In one example of the method of making the content display system, the method can further include configuring the display source controller logic to perform the following: encrypting the display symbol data at the DWord granularity level; encoding, for each unidirectional serial data channel, the display symbol data at the DWord granularity level; scrambling, for each unidirectional serial data channel, the display symbol data at the DWord granularity level; performing forward error correction (FEC) and two-way interleaving, for each unidirectional serial data channel, the display symbol data at the DWord granularity level; precoding, for each unidirectional serial data channel, the display symbol data at the DWord granularity level; and performing a parallel to serial (P-S) conversion, for each unidirectional serial data channel, the display symbol data at the DWord granularity level.

In one example of the method of making the content display system, the method can further include configuring the display source controller logic to perform the following: sending a transfer unit (TU) that includes the display symbol data for each of the unidirectional serial data channels to the display panel over the physical serial link, wherein the TU includes 32 to 64 32-bit DWords.

In one example of the method of making the content display system, the TU includes display symbol control data comprising of a plurality of DWords to indicate events and attributes of a frame.

In one example of the method of making the content display system, the unidirectional serial data channels operate concurrently, and the number of unidirectional serial data channels is equal to four in accordance with a Next Generation DisplayPort (DP) 1.5 specification.

In one example of the method of making the content display system, conversion and division of the display symbol data occurs at a link layer, and processing of the display symbol data for each unidirectional serial data channel occurs at a physical layer.

In one example of the method of making the content display system, the display source controller and the display panel support a single stream (SST) transport mode or a multi-stream (MST) transport mode.

In one example of the method of making the content display system, the display source controller and the display panel are in accordance with a Next Generation DisplayPort (DP) 1.5 specification.

In one example, there is provided at least one non-transitory machine readable storage medium having instructions embodied thereon for sending display symbol data from a display source controller to a display panel. The instructions when executed by the display source controller can perform the following: receiving, at the display source controller, display pixel data from a display source; converting, at the display source controller, the display pixel data to display symbol data that includes a plurality of 32-bit double words (DWords); dividing, at the display source controller, the display symbol data that includes the plurality of 32-bit DWords for a number of unidirectional serial data channels; processing, at the display source controller, for each unidirectional serial data channel, the display symbol data at a 32-bit DWord granularity level; and sending, from the display source controller, the display symbol data for each of the unidirectional serial data channels over a physical serial link to the display panel.

In one example of the at least one non-transitory machine readable storage medium, the at least one non-transitory machine readable storage medium can further comprise instructions when executed perform the following: redefining a granularity level of the display symbol data from a byte-level consisting of 8 bits to a DWord-level consisting of 32 bits to handle an increase in physical serial link frequency from 8.1 Gigahertz (GHz) to 20 GHz.

In one example of the at least one non-transitory machine readable storage medium, the granularity level of the display symbol data is redefined from the byte-level to the DWord-level to quadruple a symbol pipeline width and reduce an operational frequency of the symbol pipeline width, and adjust the operational frequency to match a physical serial link bandwidth.

In one example of the at least one non-transitory machine readable storage medium, the at least one non-transitory machine readable storage medium can further comprise instructions when executed perform the following: encrypting the display symbol data at the DWord granularity level; encoding, for each unidirectional serial data channel, the display symbol data at the DWord granularity level; scrambling, for each unidirectional serial data channel, the display symbol data at the DWord granularity level; performing forward error correction (FEC) and two-way interleaving, for each unidirectional serial data channel, the display symbol data at the DWord granularity level; pre-coding, for each unidirectional serial data channel, the display symbol data at the DWord granularity level; and performing a parallel to serial (P-S) conversion, for each unidirectional serial data channel, the display symbol data at the DWord granularity level.

In one example of the at least one non-transitory machine readable storage medium, the at least one non-transitory machine readable storage medium can further comprise instructions when executed perform the following: sending a transfer unit (TU) that includes the display symbol data for each of the unidirectional serial data channels to the display panel over the physical serial link, wherein the TU includes 32 to 64 32-bit DWords.

In one example of the at least one non-transitory machine readable storage medium, the TU includes display symbol control data comprising of a plurality of DWords to indicate events and attributes of a frame.

In one example of the at least one non-transitory machine readable storage medium, the unidirectional serial data channels operate concurrently, and the number of unidirectional serial data channels is equal to four in accordance with a Next Generation DisplayPort (DP) 1.5 specification.

In one example of the at least one non-transitory machine readable storage medium, the display source controller and the display panel are in accordance with a Next Generation DisplayPort (DP) 1.5 specification.

While the forgoing examples are illustrative of the principles of invention embodiments in one or more particular applications, it will be apparent to those of ordinary skill in the art that numerous modifications in form, usage and details of implementation can be made without the exercise of inventive faculty, and without departing from the principles and concepts of the disclosure.

What is claimed is:

1. A display source controller, comprising:
an interface to receive display pixel data from a display source; and
logic circuitry to:
change a granularity level of display symbol data from an 8-bit symbol granularity level to a 32-bit DWord granularity level at a link layer by redefining, at the link layer, a first 8-bit symbol, a second 8-bit symbol, a third 8-bit symbol, and a fourth 8-bit symbol to be represented as a 32-bit symbol, the 8-bit symbols corresponding to the display pixel data;
divide the display symbol data that includes the 32-bit symbol for a number of unidirectional serial data channels;
process, for ones of the unidirectional serial data channels, the display symbol data at the 32-bit DWord granularity level; and
send the display symbol data for the ones of the unidirectional serial data channels over a physical serial link to a display panel.

2. The display source controller of claim 1, wherein by redefining the 8-bit symbols to be represented as the 32-bit symbol, the 32-bit DWord granularity level of the display symbol data is to quadruple a symbol pipeline width and reduce an operational frequency of the symbol pipeline width, and adjust the operational frequency to match a physical serial link bandwidth.

3. The display source controller of claim 1, wherein the logic circuitry is to process the display symbol data for the ones of the unidirectional serial data channels by:
encrypting the display symbol data at the 32-bit DWord granularity level;
encoding, for the ones of the unidirectional serial data channels, the display symbol data at the 32-bit DWord granularity level;
scrambling, for the ones of the unidirectional serial data channels, the display symbol data at the 32-bit DWord granularity level;
performing forward error correction (FEC) and two-way interleaving, for the ones of the unidirectional serial data channels, the display symbol data at the 32-bit DWord granularity level;
pre-coding, for the ones of the unidirectional serial data channels, the display symbol data at the 32-bit DWord granularity level; and
performing a parallel to serial (P-S) conversion, for the ones of the unidirectional serial data channels, the display symbol data at the 32-bit DWord granularity level.

4. The display source controller of claim 1, wherein the logic circuitry is to: send a transfer unit (TU) that includes the display symbol data for the ones of the unidirectional serial data channels to the display panel over the physical serial link, the TU to include 32 to 64 32-bit symbols.

5. The display source controller of claim 4, wherein the TU is to include display symbol control data, the display symbol control data to include a plurality of 32-bit symbols to indicate events and attributes of a frame.

6. The display source controller of claim 1, wherein the unidirectional serial data channels operate concurrently, and the number of unidirectional serial data channels is equal to four in accordance with a Next Generation DisplayPort (DP) 1.5 specification.

7. The display source controller of claim 1, wherein the logic circuitry is to redefine the display pixel data and divide the display symbol data at the link layer, and process the display symbol data for the ones of the unidirectional serial data channels at a physical layer.

8. The display source controller of claim 1, wherein the display source controller and the display panel support a single stream (SST) transport mode or a multi-stream (MST) transport mode.

9. The display source controller of claim 1, wherein the display source controller and the display panel are in accordance with a Next Generation DisplayPort (DP) 1.5 specification.

10. A content display system, comprising:
a display source;
a display panel; and
a display source controller to:
access display pixel data from the display source;
change a granularity level of display symbol data from an 8-bit symbol granularity level to a 32-bit DWord granularity level at a link layer by redefining, at the link layer, a first 8-bit symbol, a second 8-bit symbol, a third 8-bit symbol, and a fourth 8-bit symbol to be represented as a 32-bit symbol, the 8-bit symbols corresponding to the display pixel data;

divide the display symbol data that includes the 32-bit symbol for a number of unidirectional serial data channels;

process, for ones of the unidirectional serial data channels, the display symbol data at the 32-bit DWord granularity level; and send the display symbol data for the ones of the unidirectional serial data channels over a physical serial link to the display panel.

11. The content display system of claim 10, wherein by redefining the 8-bit symbols to be represented as the 32-bit symbol, the 32-bit DWord granularity level of the display symbol data is to quadruple a symbol pipeline width and reduce an operational frequency of the symbol pipeline width, and adjust the operational frequency to match a physical serial link bandwidth.

12. The content display system of claim 10, wherein the display source controller is to process the display symbol data for the ones of the unidirectional serial data channels by:

encrypting the display symbol data at the 32-bit DWord granularity level;

encoding, for the ones of the unidirectional serial data channels, the display symbol data at the 32-bit DWord granularity level;

scrambling, for the ones of the unidirectional serial data channels, the display symbol data at the 32-bit Word granularity level;

performing forward error correction (FEC) and two-way interleaving, for the ones of the unidirectional serial data channels, the display symbol data at the 32-bit DWord granularity level;

pre-coding, for the ones of the unidirectional serial data channels, the display symbol data at the 32-bit DWord granularity level; and performing a parallel to serial (P-S) conversion, for the ones of the unidirectional serial data channels, the display symbol data at the 32-bit DWord granularity level.

13. The content display system of claim 10, wherein the display source controller is to: send a transfer unit (TU) that includes the display symbol data for the ones of the unidirectional serial data channels to the display panel over the physical serial link, the TU to include 32 to 64 32-bit symbols.

14. The content display system of claim 13, wherein the TU is to include display symbol control data, the display symbol control data to a plurality of 32-bit symbols to indicate events and attributes of a frame.

15. The content display system of claim 10, wherein the unidirectional serial data channels operate concurrently, and the number of unidirectional serial data channels is equal to four in accordance with a Next Generation DisplayPort (DP) 1.5 specification.

16. The content display system of claim 10, wherein the display source controller is to redefine the display pixel data and divide the display symbol data at the link layer, and process the display symbol data for the ones of the unidirectional serial data channels at the display source controller at a physical layer.

17. The content display system of claim 10, wherein the display source controller and the display panel support a single stream (SST) transport mode or a multi-stream (MST) transport mode.

18. The content display system of claim 10, wherein the display source controller and the display panel are in accordance with a Next Generation DisplayPort (DP) 1.5 specification.

19. A method of making a content display system, the method comprising:

providing a display source;

providing a display panel that is communicatively coupled to the display source;

providing a display source controller that is communicatively coupled to the display source and the display panel;

configuring the display source controller to at least:
access display pixel data from the display source;
change a granularity level of display symbol data from an 8-bit symbol granularity level to a 32-bit DWord granularity level at a link layer by redefining, at the link layer, a first 8-bit symbol, a second 8-bit symbol, a third 8-bit symbol, and a fourth 8-bit symbol to be represented as a 32-bit symbol, the 8-bit symbols corresponding to the display pixel data;
divide the display symbol data that includes the 32-bit symbol for a number of unidirectional serial data channels;
process, for ones of the unidirectional serial data channels, the display symbol data at the 32-bit DWord granularity level; and
send the display symbol data for the ones of the unidirectional serial data channels over a physical serial link to the display panel.

20. The method of claim 19, wherein by redefining the 8-bit symbols to be represented as the 32-bit symbol, the 32-bit DWord granularity level of the display symbol data is to quadruple a symbol pipeline width and reduce an operational frequency of the symbol pipeline width, and adjust the operational frequency to match a physical serial link bandwidth.

21. The method of claim 19, further including configuring the display source controller to:

encrypt the display symbol data at the 32-bit DWord granularity level;

encode, for the ones of the unidirectional serial data channels, the display symbol data at the 32-bit DWord granularity level;

scramble, for the ones of the unidirectional serial data channels, the display symbol data at the 32-bit DWord granularity level;

perform forward error correction (FEC) and two-way interleaving, for the ones of the unidirectional serial data channels, the display symbol data at the 32-bit DWord granularity level;

pre-code, for the ones of the unidirectional serial data channels, the display symbol data at the 32-bit Word granularity level; and perform a parallel to serial (P-S) conversion, for the ones of the unidirectional serial data channels, the display symbol data at the 32-bit DWord granularity level.

22. The method of claim 19, further including configuring the display source controller to: send a transfer unit (TU) that includes the display symbol data for the ones of the unidirectional serial data channels to the display panel over the physical serial link, the TU to include 32 to 64 32-bit symbols.

23. The method of claim 22, wherein the TU is to include display symbol control data, the display symbol control data including a plurality of symbols to indicate events and attributes of a frame.

24. The method of claim 19, wherein the unidirectional serial data channels operate concurrently, and the number of unidirectional serial data channels is equal to four in accordance with a Next Generation DisplayPort (DP) 1.5 specification.

25. The method of claim 19, further including configuring the display source controller to redefine the display pixel data and divide the display symbol data at the link layer, and process the display symbol data for the ones of the unidirectional serial data channels at a physical layer.

26. The method of claim 19, wherein the display source controller and the display panel support a single stream (SST) transport mode or a multi-stream (MST) transport mode.

27. The method of claim 19, wherein the display source controller and the display panel are in accordance with a Next Generation DisplayPort (DP) 1.5 specification.

\* \* \* \* \*